April 13, 1965   J. A. ELMES   3,177,747
CIRCULAR SAWS
Filed May 14, 1962
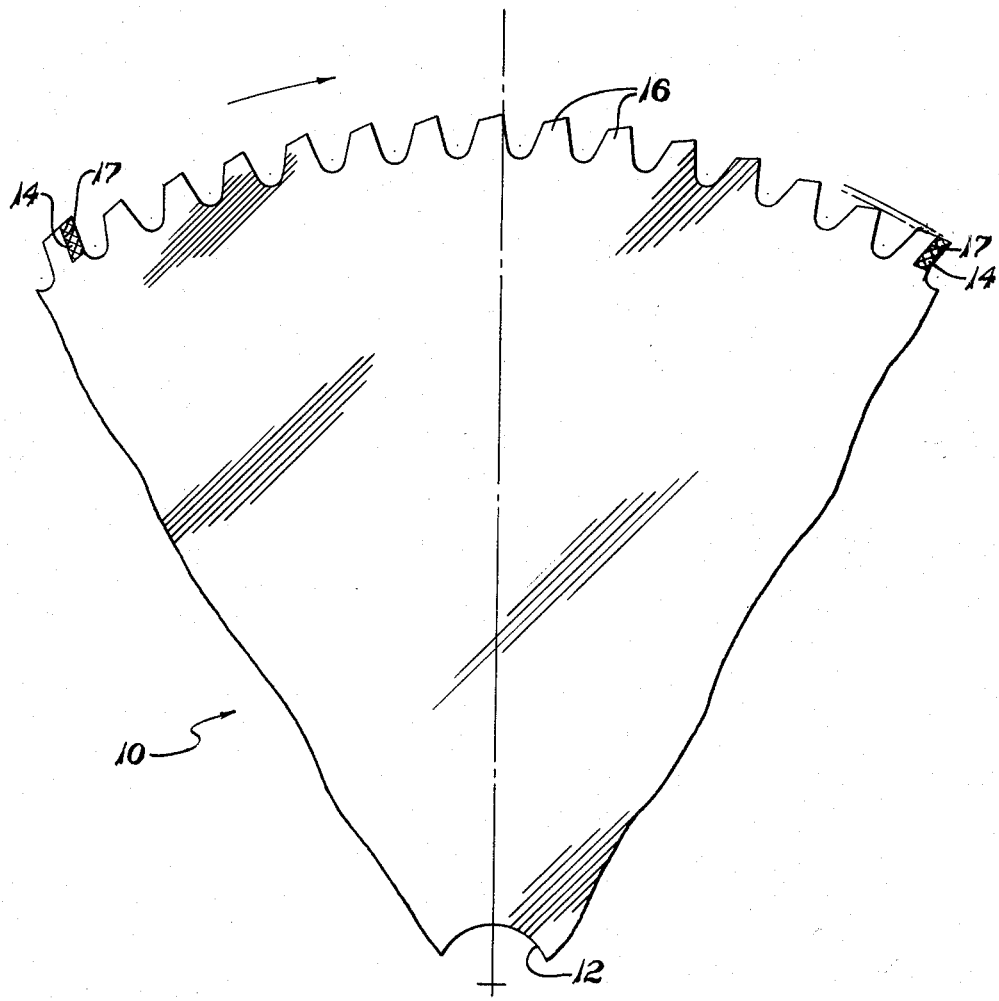
INVENTOR.
JOHN A. ELMES
BY John D. Haney
ATTY.

United States Patent Office 3,177,747
Patented Apr. 13, 1965

3,177,747
CIRCULAR SAWS
John A. Elmes, Canton, Ohio, assignor to Heinemann Saw Corporation, Canton, Ohio, a corporation of Ohio
Filed May 14, 1962, Ser. No. 194,502
5 Claims. (Cl. 83—169)

This invention relates to circular saws. According to the invention a circular saw is provided which is especially useful for sawing plastics having a heat deformation temperature in the range of about 100 to 250 degrees Fahrenheit. The improved saw comprises a special configuration of cutting teeth by which it is possible to saw such materials with a smooth, burr-free, highly finished surface along the saw kerf, without the use of liquid lubricants or other special cooling equipment.

Owing to their relatively low heat deformation temperatures, it has been difficult or even impossible in some cases to make finished saw cuts through many of the most useful industrial plastics. The heat generated by the cutting teeth in the saw kerf tends to soften and deform the material in the kerf, and also builds up deposits on the saw itself. Cutting with liquid lubricants is only modestly helpful, and is most inconvenient because of the expense and the necessity for cleaning the pieces after cutting.

Included among the plastic materials giving rise to this problem are many of the polystyrene compounds, the vinyl polymers and copolymers, polyethylene, the cellulosic materials and the acrylic materials, all of which are generally regarded as thermoplastic materials. The problem also occurs with some of the thermosetting materials such as epoxy and phenolic materials.

The improved saw of this invention includes a series of sharp cutting teeth located at very widely spaced arcuate positions on the periphery of the saw. These teeth provide the sole cutting action. In between these cutting teeth the periphery of the saw includes a multitude of fan-like projections which direct a stream of air into the saw kerf behind each cutting tooth. These fan-like projections are narrower than the cutting teeth and their extremities are radially offset inwardly from the radial extemities of the cutting teeth. Accordingly the projections do not engage the material in the kerf. Instead the projections lie entirely within the parallel cutting planes of the cutting teeth which define the kerf in a work piece. The projections function solely to blow the ambient air into the kerf.

Preferably this saw is driven at high speeds (e.g. more than about 2000 revolutions per minute) so that a continuing stream of air at high velocity is moved through kerf as each cutting tooth successively works through the plastic. This action has been found to be highly effective for making finished saw cuts. The air stream provided by the projections apparently cools the material at the kerf sufficiently to maintain the material below its heat deformation temperature. No other lubricants, or equipment to direct a cooling medium into the kerf is needed. The saw itself provides the necessary cooling action.

An example of one specific saw construction which embodies this invention is shown in the accompanying drawing. It is to be understood that the drawing shows only one fragmentary sector of a saw 10, the entire saw being a full circular metal disc adapted to be mounted for rotation by an arbor (not shown) engaged with the center hole 12 of the disc. The rotational direction is indicated by the arcuate arrow.

The saw 10 has several cutting teeth 14 at widely spaced arcuate intervals on the periphery of the saw. For balance, the cutting teeth 14 are preferably spaced at equal arcuate intervals around the periphery. The two cutting teeth 14 shown in the drawing represent the preferred tooth spacing for a saw of the diameter shown. Although the exact tooth spacing is not critical to accomplishing the desired results, the arcuate spacing between adjacent cutting teeth 14 is approximately equal to the radius of the saw.

Between each two successive cutting teeth 14 the periphery of the saw is formed with a multiplicity of fan-like projections 16 which are narrower than the cutting teeth 14 and have their extremities offset radially inwardly from the radial extremities of the teeth 14 (see dimension X). Therefore as the saw passes through a kerf, the projections 16 never actually touch the material. They merely blow air through the kerf in between the cutting action of the teeth 14 in the manner described in the foregoing.

In the saw chosen for illustration, teeth 14 are relatively wide tungsten-carbide teeth inset into notches 17 in the periphery of the saw in accordance with conventional techniques known to those skilled in this art. For this service, carbide teeth are advantageous because they are quite durable. The profile of the teeth are the same as that conventionally used in carbide saws, the back clearance angle (the angle between a tangent at the extremity of a cutting tooth and the peripheral face of the tooth leading backward from the extremity) and the hook angle (the angle between the leading face of the cutting tooth and a radius of the blade to the extremity of the tooth) being about 10–15 degrees.

The projections 16 may be of any desired shape, provided they are formed in a manner which does not unduly weaken the saw structurally, and they do not themselves engage the work piece. It is particularly convenient to make this saw from a disc of appropriate saw steel which has its periphery rough milled into a toothed profile to receive either carbide teeth, or other form of edged cutting teeth. In this case, the saw blank or disc is then sharpened or tipped for cutting, as the case may be, only at the locations of the cutting teeth 14 and the roughed milled teeth between the arcuately spaced teeth 14 are merely left unfinished and blunt to serve as the fan-like projections 16.

The cutting teeth 14 may be of any suitable profile and instead of using separate tips, the periphery of the blade may be sharpened and set at the arcuately spaced locations noted to provide the cutting teeth. In other respects the saws are made according to the traditional art of saw-smithing, including heat treating and grinding the saws and hammering them to the proper tension.

Saws made according to the foregoing description with six carbide teeth 14 spaced at equal arcuate intervals around a saw disc of 14 inches diameter and with ten or more projections in the form of blunt rough milled teeth between successive teeth 14 are suitable for cutting the plastics noted in the foregoing. These saws have been particularly effective for cutting bars of transparent methyl methacrylate compositions known commercially as "Plexiglas" with a clean burr-free dimensionally accurate kerf.

In general, the higher the heat deformation temperature of the particular plastic, the closer may be the arcuate spacing of the actual cutting teeth for successful cutting. In any event, for plastics which deform below about 225 degrees Fahrenheit, there should be multiplicity of fan-like projections between the cutting teeth. Preferably there will be in the order of about 5 to 15 projections between successive teeth where the projections have approximately the same profile as the cutting teeth as is the case in the saw illustrated.

I claim:
1. A circular saw comprising a metal disc having cut- ting teeth at the periphery thereof at widely spaced arcuate locations, and a multiplicity of fan-like projections on the peripheral regions of said disc intermediate the cutting teeth, the lateral sides of said projections lying entirely within the parallel cutting planes of said cutting teeth which define the lateral sides of the kerf in a work piece and the outermost extremities of said projections being offset radially inward from the outermost extremities of said cutting teeth which define the bottom of the kerf in a work piece, said projections thereby being proportioned to direct a stream of ambient air through the kerf between the passage of successive cutting teeth therethrough without contacting the work piece.

2. A circular saw according to claim 1 wherein said cutting teeth are arculately spaced apart on the periphery of the saw for a distance approximately equal to the radius of the disc.

3. A circular saw according to claim 2 wherein there are from 5 to 15 fan-like projections between successive cutting teeth.

4. A circular saw according to claim 1 wherein said cutting teeth are tungsten-carbide inserts.

5. A circular saw according to claim 1 wherein said fan-like projections are rough milled but unsharpened projections having a profile shaped like said cutting teeth.

References Cited by the Examiner

UNITED STATES PATENTS

| | | | |
|---|---|---|---|
| 424,301 | 3/90 | Iles | 143—133 |
| 1,334,941 | 3/20 | Blake | 143—133 |
| 1,811,079 | 6/31 | Forsyth | 83—676 |
| 2,850,056 | 9/58 | Kehl | 83—676 |
| 3,048,207 | 8/62 | Ferrari | 143—133 |

WILLIAM W. DYER, Jr., *Primary Examiner.*

CARL W. TOMLIN, *Examiner.*